(12) United States Patent
Tamura et al.

(10) Patent No.: US 6,939,060 B2
(45) Date of Patent: Sep. 6, 2005

(54) METHOD AND APPARATUS FOR HEATING FUSION SPLICED PORTION OF OPTICAL FIBERS AND OPTICAL FIBER ARRAY

(75) Inventors: Mitsuaki Tamura, Kanagawa (JP); Eiichiro Yamada, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 217 days.

(21) Appl. No.: 10/235,632

(22) Filed: Sep. 6, 2002

(65) Prior Publication Data

US 2003/0059180 A1 Mar. 27, 2003

(30) Foreign Application Priority Data

Sep. 25, 2001 (JP) ..................... P.2001-290845

(51) Int. Cl.[7] ............... G02B 6/255; G02B 6/00
(52) U.S. Cl. ..................... 385/96; 359/341.1
(58) Field of Search ............... 372/32, 35, 36; 219/444.1; 385/88–96; 81/9.41; 359/141.1, 341.1

(56) References Cited

U.S. PATENT DOCUMENTS

| | | | |
|---|---|---|---|
| 5,987,295 A | * | 11/1999 | Matsuo et al. ............. 399/330 |
| 6,417,963 B1 | * | 7/2002 | Ohishi et al. ............ 359/341.1 |
| 6,598,497 B1 | * | 7/2003 | Mizushima et al. ......... 81/9.41 |
| 2001/0017964 A1 | * | 8/2001 | Setoguchi ..................... 385/88 |
| 2002/0001323 A1 | * | 1/2002 | Sasao .......................... 372/36 |
| 2003/0132217 A1 | * | 7/2003 | Ito et al. .................. 219/444.1 |
| 2003/0161595 A1 | * | 8/2003 | Dallas et al. ................. 385/96 |

FOREIGN PATENT DOCUMENTS

| | | | |
|---|---|---|---|
| JP | 61-117508 | 6/1986 | |
| JP | 1177002 | * 7/1989 | ................ 385/97 |
| JP | 2618500 | 3/1997 | |

OTHER PUBLICATIONS

Protection and reliability of optical fiber arc fusion splicing by Arai T. Watanabe et al, Publication date Nov. 13–15, 1979 under Institute of Electrical Engineers.*

* cited by examiner

Primary Examiner—Akm Enayet Ullah
(74) Attorney, Agent, or Firm—McDermott Will & Emery LLP

(57) ABSTRACT

A vicinity of the fusion spliced portion of optical fibers is mounted on a heating board, after the dissimilar optical fibers having the different mode field diameters are fusion spliced. The vicinity of the fusion spliced portion of the optical fibers is then heated by a heat source via the heating board.

21 Claims, 9 Drawing Sheets

METHOD AND APPARATUS FOR HEATING FUSION SPLICED PORTION OF OPTICAL FIBERS AND OPTICAL FIBER ARRAY

BACKGROUND OF THE INVENTION

1. Field of the Invention

The present invention relates to heating a fusion spliced portion of optical fibers, after the dissimilar optical fibers having the different mode field diameters or core diameters are fusion spliced. More particularly, the present invention relates to a method and apparatus for heating a fusion spliced portion of optical fibers so that the optical losses associated with the splicing (hereinafter referred to as a splice loss) are low, and an optical fiber array manufactured using the same method and apparatus.

2. Description of the Related Art

In recent years, a hybrid optical fiber has been developed in which a high performance optical fiber having a smaller mode field diameter such as an optical fiber for wavelength division multiplexing transmission or an optical fiber for Raman amplification and a normal single mode optical fiber having a relatively large mode field diameter are combined. In splicing the high performance optical fiber and the normal single mode optical fiber which are different in a mode field diameter or core diameter (hereinafter referred to as a core diameter) of optical fiber, it is difficult to achieve a practical low splice loss simply by fusion splicing. Hence, there is provided a well-known method (Thermally Expanded Core, hereinafter referred to as a TEC) in which the fusion spliced portion of optical fibers is heated and tapered to equalize the core diameters of the splicing portion, and make a smooth splicing shape (refer to Japanese Patent No. 2618500).

FIGS. 9a and 9B are views showing one example of a TEC process including heating a fusion spliced portion. FIG. 9A is a view showing the TEC process of heating the fusion spliced portion of optical fibers using a burner after fusion splicing the optical fibers having different core diameters. FIG. 9B is a view showing a state of the fusion spliced portion of optical fibers after the TEC process as shown in FIG. 9A. In the figures, reference numeral 1a, 1b denotes an optical fiber, 2 denotes a glass fiber portion (cladding portion), 3a, 3b denotes a core portion, 4 denotes the fiber coatings, 5 denotes a fusion spliced portion, 6 denotes a burner, and 7 denotes a core expanded region.

The optical fibers 1a and 1b to be fusion spliced together have the same outer diameter of the glass fiber portion (cladding portion) 2, but are different in the core diameter of the core portions 3a and 3b and the specific refractive index difference. End faces of the optical fibers 1a and 1b to be spliced are disposed oppositely, fused using arc discharge, and butt jointed, as shown in FIG. 9A. Simply by making the fusion splicing, the splicing is discontinuous at the fusion spliced portion 5, because of a difference in the core diameter between the core portion 3a of the optical fiber 1a and the core portion 3b of the optical fiber 1b. This discontinuity causes a large splice loss.

To improve this discontinuity, the TEC process is conducted by heating a vicinity of the fusion spliced portion through the use of a micro torch or the burner 6 with a combustion gas. This heating is made at the temperature and for the time where the optical fibers 1a and 1b themselves are not melted, but a dopant agent, which raises the refractive index, added to the core portions 3a and 3b is diffused to the cladding portion. After this heating process, the dopant agent added to the core portions 3a and 3b is diffused to the cladding portion 2, so that the core diameter of the core portions 3a and 3b is expanded. It diffuses more in case of the optical fiber 1a having a smaller core diameter and a higher dopant concentration than the optical fiber 1b having a larger core diameter and a lower dopant concentration.

By performing the TEC process, the core diameter of the core portion 3a for the optical fiber 1a having smaller core diameter is expanded in taper form, thereby reducing a discontinuity from the core portion 3b of the optical fiber 1b having larger core diameter, as shown in FIG. 9B. In the case where the dissimilar optical fibers are fusion spliced together, it has been found that the TEC process allows the core diameter of the optical fiber having smaller core diameter to gradually approximate the core diameter of the other optical fiber, thereby reducing a splice loss. Also, it has been known that the TEC process by heating is effective to reduce the splice loss due to the core eccentricity by expanding the core diameter of the fusion spliced portion even if similar optical fibers are spliced (refer to Japanese Patent Unexamined Publication No. Sho. 61-117508).

SUMMARY OF THE INVENTION

The present invention has been achieved in the light of the above-mentioned problems. It is an object of the invention to provide a method and apparatus for heating a fusion spliced portion of optical fibers, and an optical fiber array manufactured using the same, in which when the TEC process is performed for the fusion spliced portion of optical fibers for the purpose of loss improvement after the dissimilar optical fibers are fusion spliced, the optical fibers are not deformed due to heating, the fiber coatings are not burnt, the ribbon shaped optical fibers are not dispersedly heated, and the TEC length is restricted within a predetermined range.

However, for obtaining a high-strength splice using a fusion splice method, a method has been employed in which the length for removing the fiber coatings and exposing the glass fiber portion 2 is made as short as possible (about 2 to 5 mm), and the fiber coatings 4 are directly clamped. In this case, coating removal ends 8 of the fiber coatings 4 may be burnt or melted by a flame of the burner 6, as shown in FIG. 10A. Therefore, it is required that the fiber coatings 4 should be removed to the position fully farther away from the flame of the burner 6, enabling the fusion splicing with high strength.

Also, it is required in the TEC process that the heating is made at the temperature and for the time sufficient for the dopant agent of the core portions 3a and 3b to be diffused to the cladding portion 2. The optical fibers 1a and 1b are usually heated below the melting point, but a heated portion 9 is sometimes softened too much to cause a slack due to a dead weight of the optical fiber, as shown in FIG. 10B. If the optical fibers are kept deformed due to slack, it may cause loss increase. Furthermore, a flame of the burner has uneven temperature distribution and broadening, and the flame is fluctuated due to the outer environments, whereby it is difficult to control the flame in a constant heating condition. Therefore, if the TEC length is dispersed, and the area subjected to the TEC process is increased beyond necessity, the optical fiber is inconvenient for handling in the manufacture, and unfavorable in respect of the strength. In the case where such an optical fiber is incorporated into optical parts such as an optical fiber array, the optical parts can not be miniaturized and packaged at high density.

In an optical fiber ribbon, an assembly with 8 fibers, 12 fibers or 24 fibers may be fusion spliced together and subjected to the TEC process. In this case, a flame of the burner 6 has the higher heating temperature in the outer portion of the flame than in the center, which result in non-uniformly heating the optical fibers, as shown in FIG. 10C. This causes a problem that the TEC process has a difference between the outer fiber and the inner fiber in an optical fiber ribbon, leaving a difference in the loss among the fibers within the optical fiber ribbon.

According to the present invention, there is provided a method for heating a fusion spliced portion of optical fibers respectively having different mode field diameters, the method comprising: mounting a vicinity of the fusion spliced portion of optical fibers on a heating board; and heating the heating board using a heat source so that the vicinity of the fusion spliced portion of optical fibers is heated via the heating board.

Further, according to the invention, there is provided an apparatus for heating a fusion spliced portion of a pair of optical fibers respectively having different mode field diameters, the apparatus comprising: a heating board for mounting a vicinity of the fusion spliced portion of optical fibers thereon; and a heat source for heating the heating board so that the vicinity of the fusion spliced portion of optical fibers is heated via the heating board.

Also, according to the invention, there is provided an optical fiber array comprising: at least a pair of optical fibers respectively having different mode field diameters, which are fusion spliced; and a substrate having a convex portion being in contact with a vicinity of a fusion spliced portion of the optical fibers on an inner face of the substrate.

DETAILED DESCRIPTION OF THE INVENTION

Figure 1A:
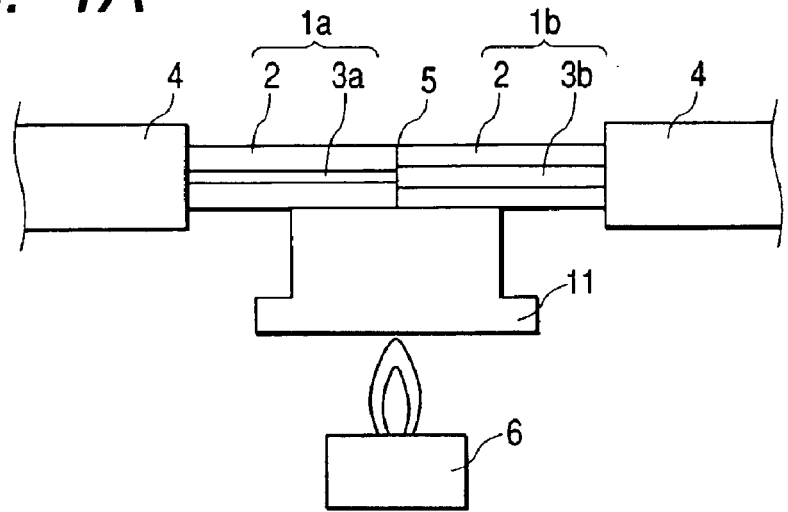
FIGS. 1A–1C are views for explaining a first embodiment of the present invention.
Figure 1B:
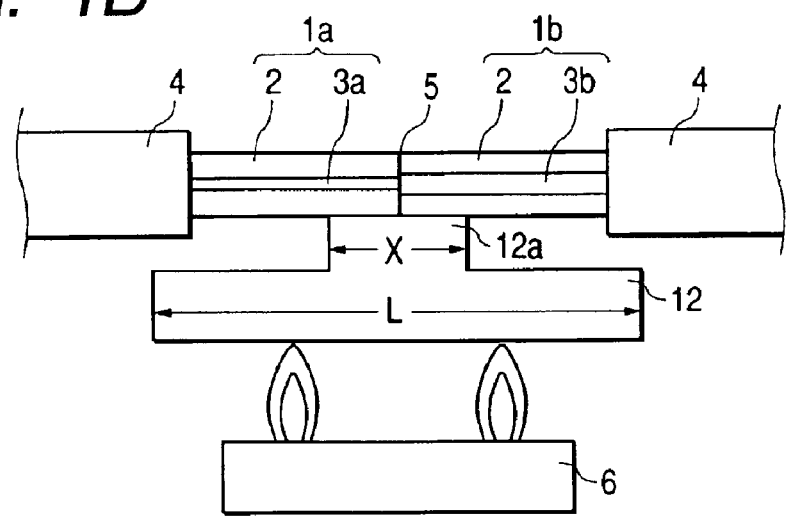
Figure 1C:
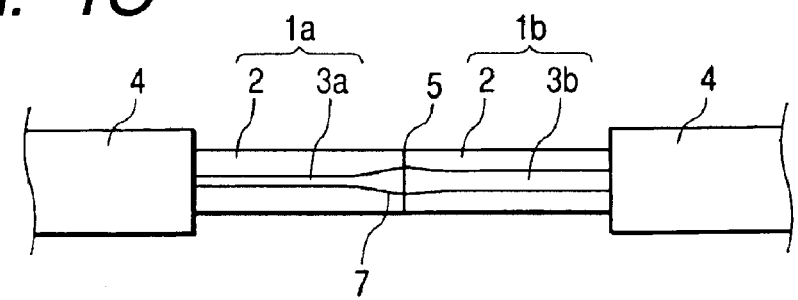

FIGS. 1A–1C show a first embodiment of the present invention. FIGS. 1A and 1B are views showing how a fusion spliced portion is heated on a heating board. FIG. 1C is a view showing a state where the fusion spliced portion of optical fibers is subjected to the TEC process by heating. In FIGS. 1A and 1B, reference numeral 11, 12 denote the heating board. Other parts are designated by the same numerals as shown in FIGS. 9A and 9B, and the description of them is omitted.

Figure 9A:
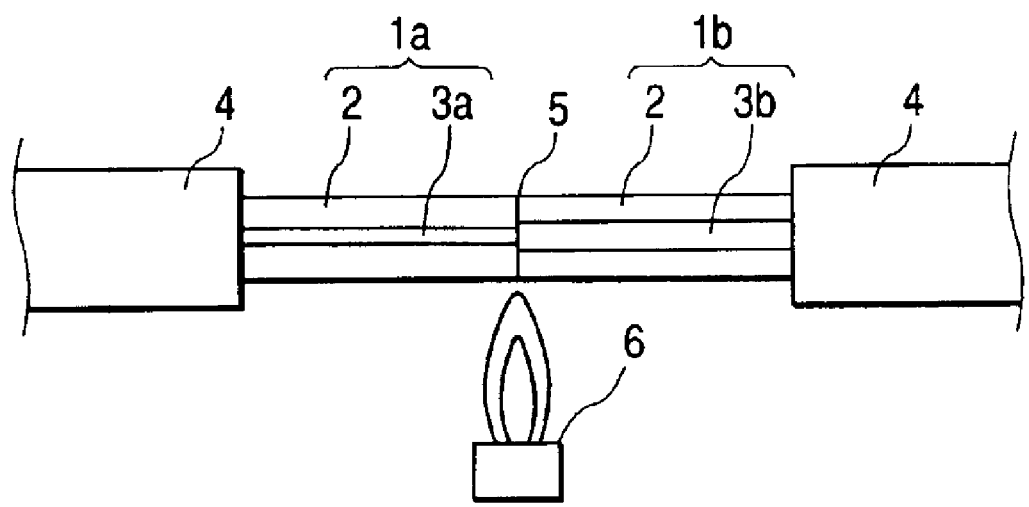
FIGS. 9A and 9B are views for explaining the conventional heating method and TEC process.
Figure 9B:
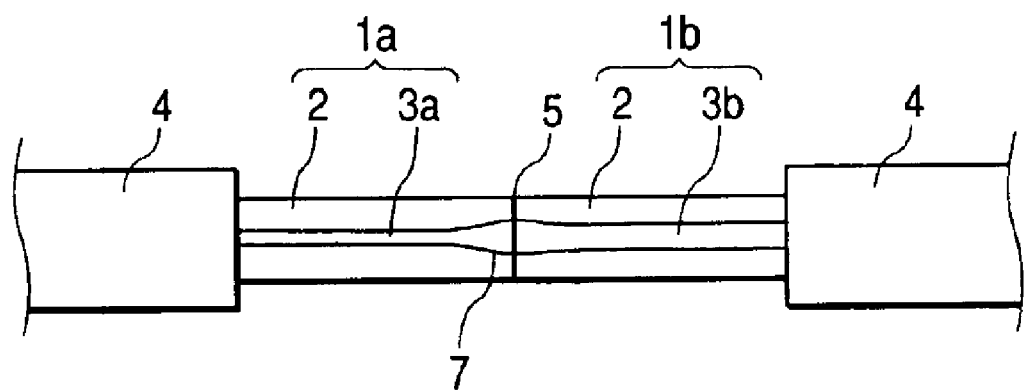

The dissimilar optical fibers 1a and 1b to be fusion spliced together have substantially the same outer diameter of a glass fiber portion (cladding portion) 2, but are different in the mode field diameter (hereinafter referred to as a core diameter) of the core portions 3a and 3b and the specific refractive index difference in the same manner as shown in FIGS. 9A and 9B. For instance, the core diameter of the optical fiber 1a is about 5 µm, and the core diameter of the optical fiber 1b is about 10 µm. End faces of the optical fibers 1a and 1b to be spliced are disposed oppositely, fusion spliced using an arc discharge, as shown in FIG. 1A. Simply by fusion splicing, the splicing is discontinuous in the fusion spliced portion 5, due to a difference in the core diameter between the core portion 3a of the optical fiber 1a and the core portion 3b of the optical fiber 1b. This discontinuity causes a large splice loss.

To solve the discontinuous state in the core portions 3a and 3b, the TEC process is performed by heating a vicinity of the fusion spliced portion 5. In this invention, the heating board 11 is employed for heating, and the optical fibers after being fusion spliced are mounted on the heating board 11, which is then heated by a burner 6. That is, the vicinity of the fusion spliced portion 5 of the optical fibers is heated via the heating board 11. The heating board 11 is formed of ceramics, preferably aluminum nitride, which has an excellent heat resistance and thermal conductivity and has a thermal expansion coefficient close to that of optical fiber glass. Though being expensive in respect of the cost, diamond may be used. Particularly, when aluminum nitride is used, the heating board can be finished with small surface roughness not to damage a glass fiber portion that is contacted.

Figure 10A:
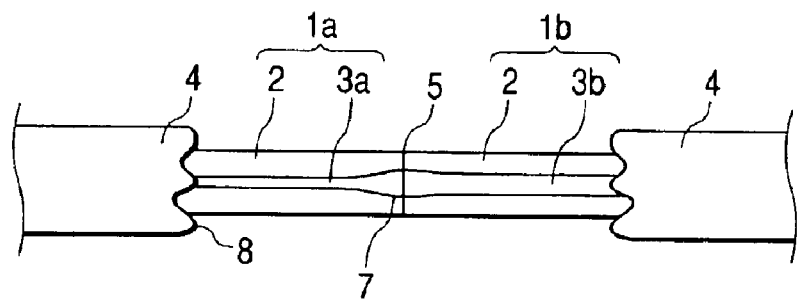
FIGS. 10A–10C are views for explaining the problems associated with the prior art.
Figure 10B:
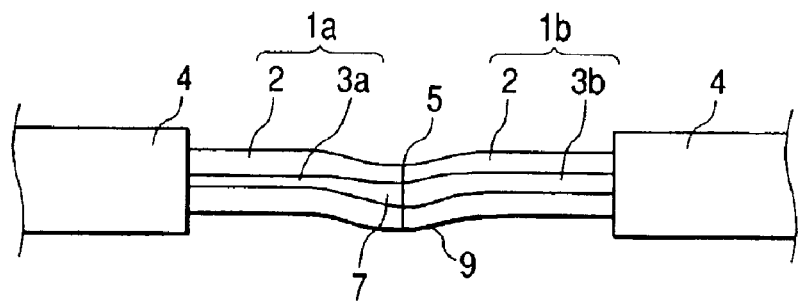
Figure 10C:
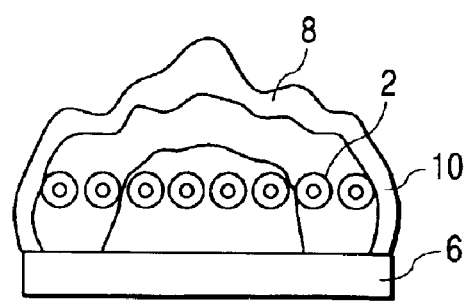

The optical fibers 1a and 1b are heated by thermal conduction and radiation from the heating board 11, but not directly burnt by a flame from the burner 6. Therefore, the optical fibers 1a and 1b can be heated substantially uniformly. Since the optical fibers 1a and 1b are mounted on the heating board 11, the optical fibers 1a and 1b are not slacked or deformed, even if being softened by heating, thereby preventing the splice loss from increasing, as shown in FIGS. 10A–10C.

The heating board 12 of FIG. 1B has a length L in an optical fiber axial direction that is defined as the length in which the end portions of the optical fiber coatings 4 are shielded from the field of view of the burner 6, and a length X of a convex portion 12a being in contact with the optical fibers 1a and 1b that is defined as the TEC length. The range of heating the vicinity of the fusion spliced portion 5 mounted on the convex portion 12a of the heating board 12 is limited by the length X of the convex portion 12a, allowing the heating to be made in uniform temperature distribution. Thereby, the TEC area is prevented from extending more than necessary. The bottom portion of the heating board 12 is extended near the end portions of the fiber coatings 4, thereby preventing the end portions of the fiber coatings 4 from being burnt or melted by a flame of the burner, as shown in FIG. 10A.

The optical fibers are heated via the heating board 11, 12 at the temperature and for the time where the optical fibers 1a and 1b themselves are not melted, but a dopant agent added to the core portions 3a and 3b is diffused to the cladding portion 2. Since the temperature of the heating board 11, 12 is easily detected, the heating can be easily controlled. By this heating, the dopant agent added to the core portions 3a and 3b is diffused to the cladding portion 2, so that the core diameter of the core portions 3a and 3b is expanded to have a core expanded region 7. It diffuses more in case of the optical fiber 1a having a smaller core diameter and a higher dopant concentration than the optical fiber 1b having a larger core diameter and a lower dopant concentration. By performing the TEC process, the core diameter of the core portion 3a of the optical fiber 1a having smaller core diameter is expanded more in taper form than the core portion 3b of the optical fiber 1b, thereby reducing a discontinuity between the core portion 3a of the optical fiber 1a and the core portion 3b of the optical fiber 1b, as shown in FIG. 1C.

Figure 2A:
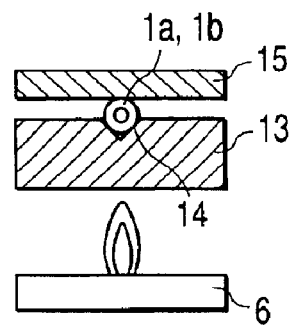
FIGS. 2A–2C are views for explaining a second embodiment of the invention.
Figure 2B:
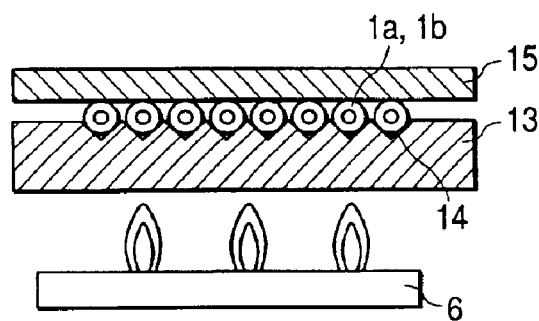
Figure 2C:
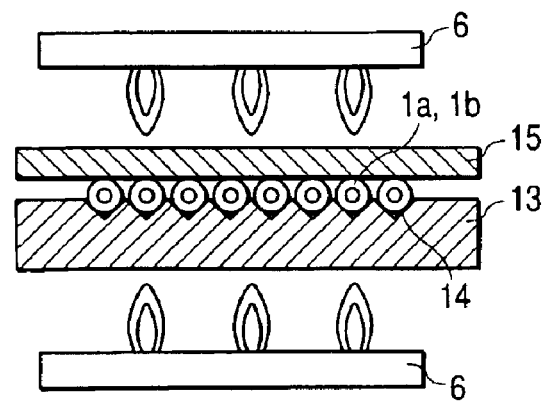

FIGS. 2A–2C show a second embodiment of the present invention. FIG. 2A shows an example of a single optical fiber, FIG. 2B shows an example of a ribbon shaped optical fiber, and FIG. 2C shows another example of heating. In FIGS. 2A–2C, reference numeral 13 denotes a heating board, 14 denotes a V-groove, and 15 denotes a lid member. Other parts are designated by the same numerals as shown in FIGS. 1A–1C, and the description of them is omitted.

In this embodiment, the optical fibers 1a and 1b mounted on the heating board 13 are lightly pressed by the lid member 15, and kept from detaching from the heating board 13. The optical fibers 1a and 1b are securely contacted with the heating board 13 to make the thermal conduction uniform and enable the stable heating. The heating board 13 and the lid member 15 are formed of ceramics that has an excellent heat resistance and thermal conductivity and has a thermal expansion coefficient close to that of the optical fiber glass, as in FIGS. 1A–1C. The burner 6 is disposed beneath a lower face of the heating board 13 to uniformly heat a predetermined range of the optical fibers 1a and 1b via the heating board 13, thereby effecting the TEC process.

In this second embodiment, the heating board 13 can be configured with a groove on its upper face. The shape of the groove is preferably a V-groove 14 typically employed for positioning the optical fiber, as shown in FIGS. 2A–2C. In a case of the ribbon shaped optical fibers as shown in FIG. 2B, exhaust nozzles of flame of the burner 6 are provided like a matrix to heat an array of the optical fibers uniformly. In the case of the ribbon shaped optical fibers, no flame of the burner 6 is directly applied to the optical fibers, or turned round the optical fibers, whereby the heating temperature is not different over the array of optical fibers due to temperature differences between the central part and the outer part of the flame, as shown in FIG. 10C. Accordingly, the TEC process can be performed uniformly for all the ribbon shaped optical fibers.

Since the optical fibers 1a and 1b are held in the V-groove 14 of the heating board 13, the contact area of optical fibers with the heating board 13 is increased and the radiation of heat from the lateral face of optical fibers is also increased, as compared with the case of FIGS. 1A–1C, whereby the uniformity of heating is enhanced. Since the optical fibers are pressed by the lid member 15, they are positioned at high precision. Even if the optical fibers 1a and 1b are softened by heating, the optical fibers 1a and 1b are not curved, but are kept straight.

The burner 6 may be disposed on the side of the lid member 15 to apply heat from the side of the lid member 15. In this case, the lid member 15 serves as the heating board. Furthermore, the burners 6 may be disposed on both sides of the heating board 13 and the lid member 15 to apply heat from both the upper and lower sides, as shown in FIG. 2C. Thereby, the uniformity of heating the optical fibers can be enhanced.

Figure 3A:
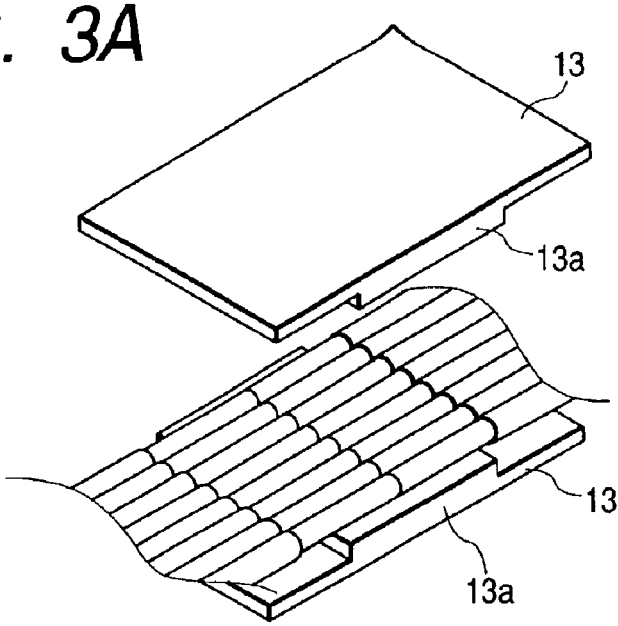
FIGS. 3A–3C are views for explaining a third embodiment of the invention.
Figure 3B:
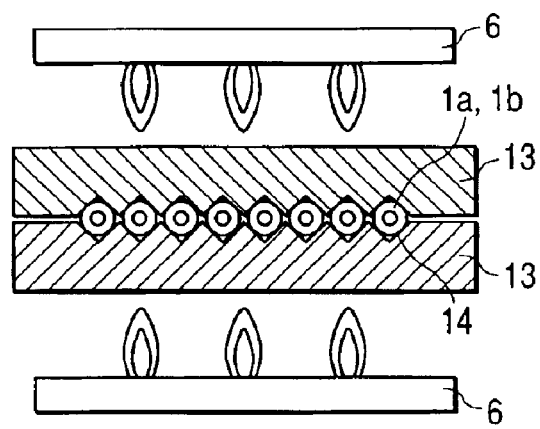
Figure 3C:
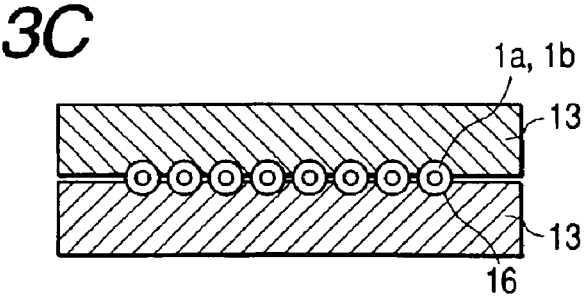

FIGS. 3A–3C show a third embodiment of the present invention. FIG. 3A shows a perspective view of the heating board, FIG. 3B is a view showing an example of employing the V-groove, and FIG. 3C is a view showing an example of employing a semi-spherical groove. In FIG. 3C, reference numeral 16 denotes the semi-spherical groove. Other parts are designated by the same numerals as shown in FIGS. 2A–2C, and the description of them is omitted.

This embodiment is a variation of FIG. 2C, in which the heating boards 13 with the V-groove 14 are provided on both the upper and lower sides. That is, the V-groove 14 is provided on the side of the lid member 15 as well. The optical fibers 1a and 1b are positioned and held by the upper and lower V-grooves 14, with high positioning precision, and because the burners 6 are disposed on both the upper and lower sides, the uniformity of heating can be more excellent than in the case of FIG. 2C.

In FIG. 3C, the semi-spherical groove 16 is formed instead of the V-groove 14 for positioning the optical fibers 1a and 1b in FIG. 3B. Though not shown in the figure, the burner 6 may be disposed on any one of the lower side and the upper side, or on both the lower and upper sides, employing the heating board 13 with the semi-spherical groove 16 and the lid member 15 without groove, as shown in FIGS. 2A–2C. The groove for positioning the optical fibers 1a and 1b is the semi-spherical groove 16, whereby the contact area with the optical fibers 1a and 1b is broadened. Accordingly, the heating board with the semi-spherical groove 16 can enhance more uniformity of heating than with the V-groove 14.

Figure 4A:
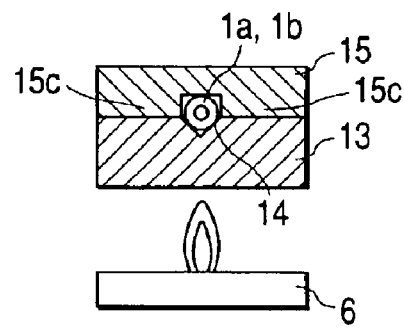
FIGS. 4A–4C are views for explaining a fourth embodiment of the invention.
Figure 4B:
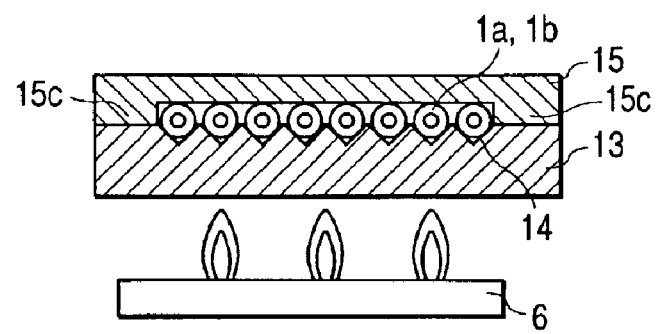
Figure 4C:
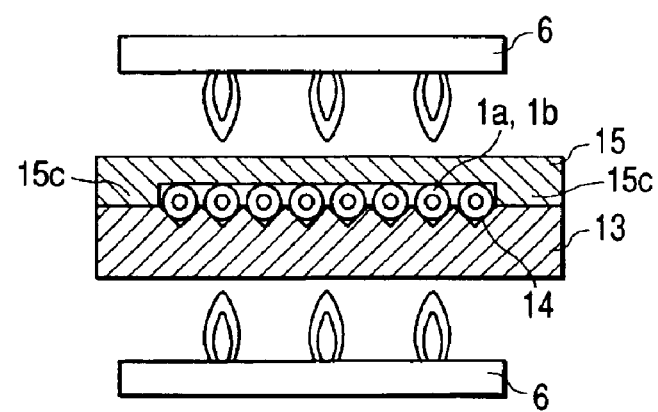

FIGS. 4A–4C show a fourth embodiment of the present invention. FIG. 4A shows a view showing an example of a single core optical fiber, FIG. 4B is a view showing an example of a ribbon shaped optical fiber, and FIG. 4C is a view showing another example of heating. In FIGS. 4A–4C, the same or like parts are designated by the same numerals as shown in FIGS. 2A–2C, and the description of them is omitted.

As shown in the example of FIG. 1A, if an upper portion of the optical fiber mounted on the heating board 13 is exposed, it is supposed that the heat is diffused from an exposed face of the optical fiber under certain working conditions, resulting in non-uniformity of the heat. If the upper side of optical fiber is covered by the lid member 15 as shown in the example of FIGS. 2A, but both sides of the heating board 13 and the lid member 15 are opened, it is supposed that the heat is likely to escape from both sides of the heating board 13 and the lid member 15, similarly resulting in non-uniformity of the heat. Thus, in this fourth embodiment, the lid member 15 has the leg portions 15c which are shaped so that both sides of the lid member 15 may be in contact with the upper face of the heating board 13, thereby enclosing the whole heated portion of the optical fibers 1a and 1b mounted on the heating board 13.

With this constitution, the diffusion of heat can be suppressed by reducing the exposed face in the heated portion of the optical fiber. The heat of the heating board 13 is transferred via the leg portions 15c to the lid member 15, so that the optical fibers 1a and 1b are heated from the side of the lid member 15, resulting in the improvement of the heating efficiency and the uniformity of heating. Since the leg portions 15c of the lid member 15 are in contact with the surface of the heating board 13, the function of pressing the optical fibers 1a and 1b against the heating board 13 as shown in FIGS. 2A–2C may become weaker, however, the heating and the uniformity of heat can be maintained by enclosing the outer periphery of the optical fibers using the lid member and leg portions.

In the case of the ribbon shaped optical fiber as shown in FIG. 4B, the lid member 15 is heated via the leg portions 15c, and all the optical fibers are heated from the side of the lid member 15, enhancing the heating efficiency and uniformity of heat. Furthermore, the lid member 15 maybe heated by the burner 6 as shown in FIG. 4C, in the same manner as in the example of FIG. 2C. In this case, the temperature of the heating board 13 and the lid member 15 is made even through the leg portions 15c, whereby the uniformity of heating all the optical fibers can be further enhanced.

Figure 5A:
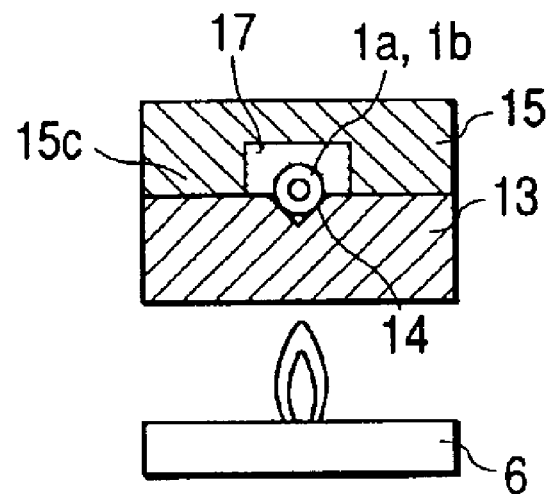
FIGS. 5A and 5B are views for explaining a fifth embodiment of the invention.
Figure 5B:
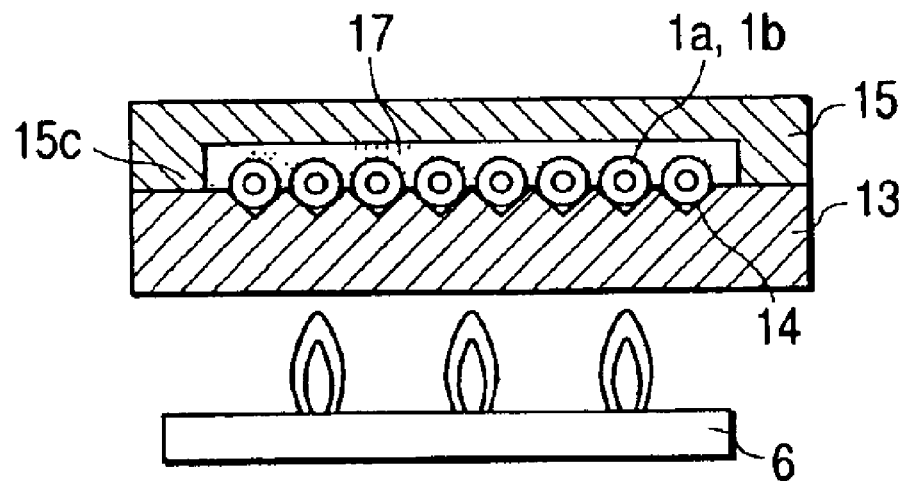

FIGS. 5A and 5B show a fifth embodiment of the present invention. FIG. 5A shows a view showing an example of a single core optical fiber, and FIG. 5B is a view showing an example of a ribbon shaped optical fiber. In FIGS. 5A and 5B, reference numeral 17 denotes an inorganic powder material. Other parts are designated by the same numerals as shown in FIGS. 2A–2C, and the description of them is omitted.

As shown in the example of FIGS. 4A–4C, if there is any gap between the heating board 13 or the lid member 15 and the optical fibers even though the heated portions of the optical fibers 1a and 1b are not exposed, it is supposed that the heating is not made uniformly. Since the air has poor thermal conductivity, it is supposed that the heating board lacks thermal uniformity depending on whether the portion of the optical fiber is in contact with the heating board 13 or the lid member 15 or not. Thus, in this fifth embodiment, a concave portion for enclosing the optical fibers that is formed from the leg portions 15c of the lid member 15 as shown in FIGS. 4A–4C is made slightly larger, and the inorganic powder material 17 is filled in this concave portion. Therefore, the gap around the optical fibers is reduced as much as possible.

The inorganic powder material 17 may be fine powder, such as aluminum nitride powder, having excellent thermal conductivity at a melting point as high as at least a softening temperature of the optical fiber glass. This inorganic powder material has flowability by adding solvent such as water or alcohol, and then filled in the gap portion. In the case where the V-groove 14 is provided on the heating board 13, the inorganic powder material is preferably filled in the gap portion developed between the V-groove and the optical fibers. The water or alcohol is vaporized by heating, but because the gap portion to be filled is minute, the inorganic powder remains within the gap, reducing the volume of gap, and transferring the heat from the heating board 13 and the lid member 15, where by the heating of the optical fibers 1a and 1b can be made uniform.

Figure 6A:
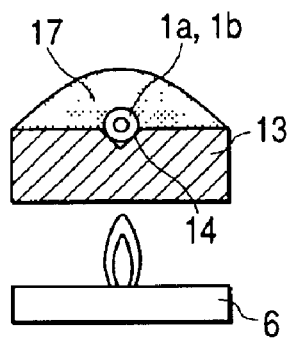
FIGS. 6A and 6B are views for explaining a sixth embodiment of the invention.
Figure 6B:
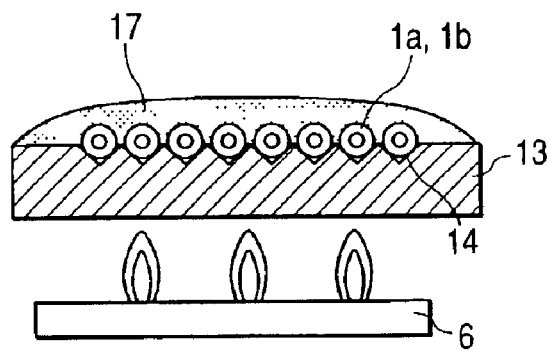

FIGS. 6A and 6B show a sixth embodiment of the present invention. FIG. 6A shows a view showing an example of a single core optical fiber, and FIG. 6B is a view showing an example of a ribbon shaped optical fiber. In FIGS. 6A and 6B, the same or like parts are designated by the same numerals as shown in FIGS. 2A–2C and 5A–5B, and the description of them is omitted.

As shown in the example of FIGS. 5A and 5B, there is some difficulty in the workability in filling the inorganic powder material 17 in the concave portion, because the flow out of powder material or the amount of filling is cared about. Thus, in this sixth embodiment, the inorganic powder material 17 is directly added on the optical fibers 1a and 1b mounted on the heating board 13, without employing the lid member 15. The inorganic powder material 17 is mixed into the resin that is relatively thermal resistant, and made like clay, thereby securing the optical fibers 1a and 1b on the heating board 13, employing a mold. In the case where the V-groove 14 is provided on the heating board 13, the inorganic powder material is preferably filled in a gap portion developed between the V-groove and the optical fibers. The powder material that is not clay-like may be directly filled in the V-groove 14.

The inorganic powder material 17 wholly encloses the exposed heated portions of the optical fibers 1a and 1b to prevent the heat diffusion from the exposed portions. Therefore, the heat transferred from the heating board 13 to the inorganic powder material 17 is also applied from the side of the exposed portions of the optical fibers, thereby heating the optical fibers uniformly. At high temperatures, the resin material which binds the inorganic material is burnt or carbonized, and consequently the resin material is removed, particularly causing no problem.

Figure 7:
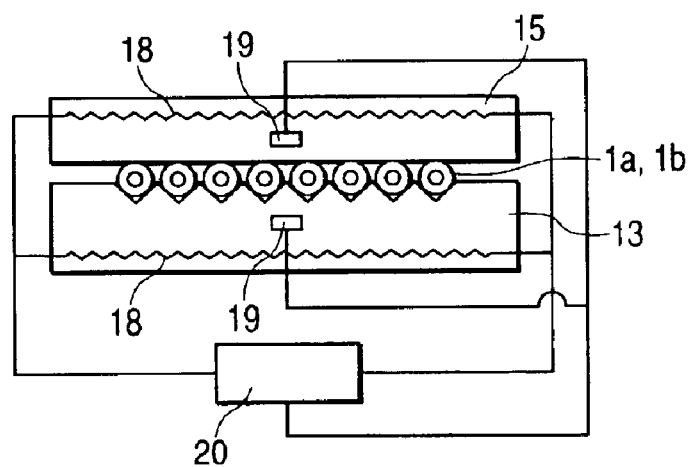
FIG. 7 is a view showing an example of employing an exothermic resistive heater for a heating source of the invention.

FIG. 7 is a view showing a seventh embodiment in which an exothermic resistive heater is employed instead of the burner. In FIG. 7, reference numeral 18 denotes the exothermic resistive heater, 19 denotes a temperature detector, and 20 denotes a temperature controller. Other parts are designated by the same numerals as shown in FIGS. 2A–2C, and the description of them is omitted. The exothermic resistive heater 18 is embedded into the heating board 13 or the lid member 15, as shown in FIG. 7, but it may be attached on or disposed adjacent to an outer surface of the heating board 13 or the lid member 15. The heating temperature of the heating board 13 or the lid member 15 can be easily detected by the temperature detector 19 embedded therein or attached on the outer surface. A temperature detection signal from this temperature detector 19 is input into the temperature controller 20 to adjust a heater current, and control the heating temperature of the heating board 13 or the lid member 15, whereby the TEC process can be effected with easy and stable temperature control.

Figure 8A:
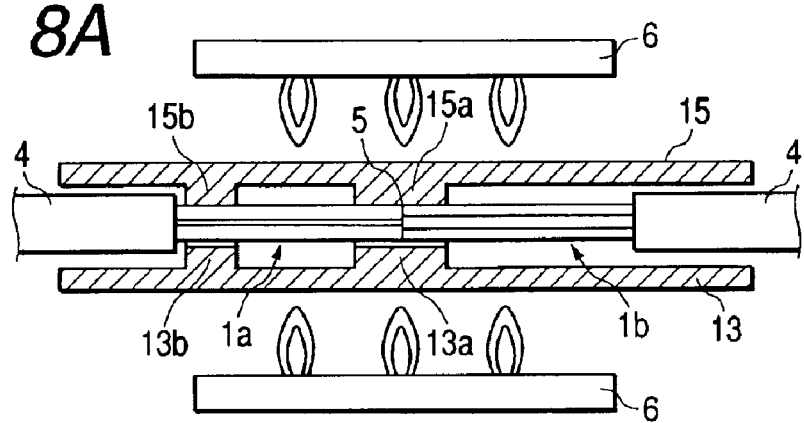
FIGS. 8A–8D are views showing an example of an optical fiber array according to the invention.
Figure 8B:
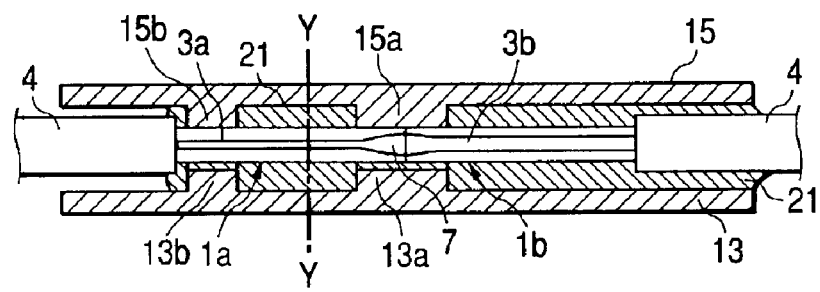
Figure 8C:
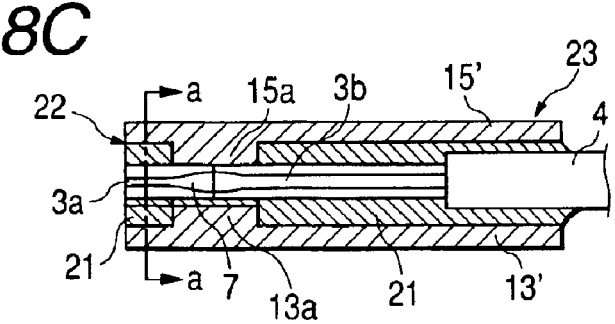
Figure 8D:
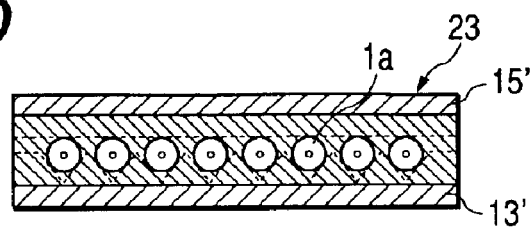

FIGS. 8A–8D are views showing an example of an optical fiber array for use with the coupling with a planar waveguide according to the invention. FIG. 8A is a view showing a TEC process state, FIG. 8B is a view showing a state after the TEC process, FIG. 8C is a view showing the optical fiber array, and FIG. 8D is a view showing the cross section a—a of the optical fiber array. In FIGS. 8A–8D, reference numeral 21 denotes an adhesive and 22 denotes a sectional plane. Other parts are designated by the same numerals as shown in FIGS. 1A–1C and 2A–2C, and the description of them is omitted.

In coupling the optical fiber with the planar waveguide, the optical fiber having a small core diameter is employed to couple with the planar waveguide, and the optical fiber having an ordinary core diameter is employed for the line. Therefore, in the optical fiber array for coupling, the optical fiber having small core diameter is fusion spliced at the top end of the optical fiber having ordinary core diameter. The fusion spliced portion is subjected to the TEC process to reduce the splice loss. However, if the TEC length is longer, the optical fiber array dimension is increased, preventing the miniaturization and high density packaging of optical parts. Also, there was inconvenience in handling at the time of manufacturing the optical fiber array, but the problems can be solved by using the heating board of the invention.

In FIG. 8A, the optical fibers 1a having small core diameter and the optical fiber 1b having large core diameter that are fusion spliced are mounted on the heating board 13 having the V-groove for single fiber or plurality of fibers, and pressed and positioned by the lid member 15, as shown in FIG. 2B. The heating board 13 and the lid member 15 are formed of ceramics that has an excellent heat resistance and thermal conductivity, with a thermal expansion coefficient close to that of the optical fiber glass.

The heating board 13 and the lid member 15 respectively have convex portions 13a and 15a for obtaining a predetermined TEC length and convex portions 13b and 15b for positioning the optical fiber 1a correctly. The heating board 13 and the lid member 15 have the length which is longer than a distance between the end portions of the fiber coatings 4 for the optical fibers 1a and 1b. The length of the convex portion 13a and 15a being in contact with the optical fibers 1a and 1b is set to obtain the predetermined TEC length. The convex portions 13b and 15b can be provided farther away from the convex portions 13a and 15a. The heating board 13 and the lid member 15 for the optical fiber are heated by the burner 6, and the TEC process is preformed in the vicinity of the fusion spliced portion of the optical fibers 1a and 1b.

FIG. 8B shows a state after the TEC process, in which a core expanded region 7 is formed in the vicinity of the fusion spliced portion of the optical fibers 1a and 1b, where the core diameters 3a and 3b of the optical fibers 1a and 1b increase gradually within the core expanded region 7 as approaching near to the fusion splice point, finally they match each other. Therefore, a discontinuous state of the core diameters is matched by smoothly tapering. After the TEC process is performed, the heating board 13 and the lid member 15 are not removed, but directly employed as a substrate of the optical fiber array. By flowing the adhesive 21 into a gap portion between the optical fibers 1a and 1b, the heating board 13 and the lid member 15, the optical fibers 1a and 1b are integrated together with the heating board 13 and the lid member 15. Thereafter, the optical fiber 1a having smaller core diameter is cut in the middle with a part of the heating board 13 and the lid member 15 at the position indicated by the chain line Y—Y. The convex portions 13b and 15b for positioning the optical fiber 1a is also removed by this cutting.

FIG. 8C shows an optical fiber array 23 formed by cutting and removing the optical fiber 1a, a cut sectional plane 22 being polished. On the sectional plane 22, the optical fiber 1a having smaller core diameter is exposed, and coupled with an optical path of the planar waveguide, and on the other side, the optical fiber 1b having larger core diameter is sealed with the adhesive 21 and led out. The heating board 13 and the lid member 15 are employed as the substrates 13' and 15' constituting the optical fiber array. FIG. 8D shows a cross section a—a of the optical fiber array 23, in which a plurality of optical fibers 1a are correctly positioned in the V-groove 14, and the adhesive 21 is filled between the substrates 13' and 15' and in the gap between the optical fibers and the substrates 13' and 15' to integrate the optical fibers and the substrates.

The heating board 13 and the lid member 15 have a heating area accurately restricted by the convex portions 13a and 15a, and formed in a predetermined TEC length, whereby the optical fiber array can be configured in the least dimension as required. If the heating board 13 and the lid member 15 are employed directly as the substrates 13' and 15' of the optical fiber array 23, it is unnecessary to remove the optical fibers from the heating board 13 and incorporate them into another substrate, resulting in better workability. Furthermore, the optical fibers may be damaged during the operation for carrying the optical fibers that are removed from the heating board after the TEC process onto the substrate, but there is less chance of causing such damages to produce the reliable optical fiber array. The application to optical parts has been described above, using the example of the optical fiber array, but the invention may be applied to other optical parts containing the fusion spliced portion of dissimilar optical fibers.

As shown in FIGS. 5A and 5B, in producing the optical fiber array 23 of FIG. 8C, the inorganic powder material is filled between the convex portions 13a and 15a that are then subjected to the TEC process by heating. In this optical fiber array 23, the heating board 13 and the lid member 15 can be directly employed as the substrates 13' and 15', whereby it is not always required that the inorganic powder material is removed. Accordingly, in this case, the inorganic powder material may be melted by heating and have adhesive property, whereby the inorganic adhesives mainly composed of silica or alumina (e.g., Ceramuse SA2000 made by Byorogos Inc.) may be used. The glass fine powder having low melting point (e.g., alumina sealing glass powder or ceramics sealing glass powder with low expansion made by Nippon Electric Glass Co., Ltd.) may be employed with the addition of water or alcohol to be easily filled.

The inorganic adhesive filled in the gap between the convex portions 13a and 15a of the substrates 13' and 15' and the optical fibers 1a and 1b prevents the heat from dissipating in the TEC process through the gap portion, thereby heating the optical fibers 1a and 1b uniformly. Also, the adhesive may serve to integrate the substrates 13' and 15' and the optical fibers 1a and 1b after heating.

As will be apparent from the above description, with the present invention, the optical fibers are prevented from being softened and deformed by heating for the TEC process, and the fiber coatings are prevented from being burnt. For the ribbon shaped optical fiber, the TEC process can be made by substantially uniformly heating all the optical fibers. Furthermore, the TEC length can be limited in a predetermined area, and the spliced optical fibers are obtained reliably, at high quality, and with small splice loss, and reduced in size.

What is claimed is:

1. A method for heating a fusion spliced portion of optical fibers respectively having different mode field diameters, the method comprising:

mounting a vicinity of the fusion spliced portion of optical fibers on a heating board; and heating the heating board using a heat source so that the vicinity of the fusion spliced portion of optical fibers is heated via the heating board, wherein said mounting step includes mounting the fusion spliced potion of optical fibers in contact with a convex portion provided in the heating board so that the fusion spliced portion of optical fibers is heated via the convex portion of the heating board.

2. The method for heating the fusion spliced portion of optical fibers according to claim 1, further comprising;

pressing the optical fibers against the heating board by a lid member.

3. The method for heating the fusion spliced portion of optical fibers according to claim 1, further comprising;

enclosing the optical fibers by a lid member having both side portions being in contact with the heating board.

4. A method for heating a fusion spliced portion of optical fibers respectively having different mode field diameters, the method comprising:

mounting a vicinity of the fusion spliced portion of optical fibers on a heating board;

heating the heating board using a heat source so that the vicinity of the fusion spliced portion of optical fibers is heated via the heating board;

enclosing the optical fibers by a lid member having both side portions being in contact with the heating board; and filling an inorganic powder material around the optical fibers in a gap between the heating board and the lid member.

5. A method for heating a fusion spliced portion of optical fibers respectively having different mode field diameters, the method comprising:

mounting a vicinity of the fusion spliced portion of optical fibers on a heating board;

heating the heating board using a heat source so that the vicinity of the fusion spliced portion of optical fibers is heated via the heating board; and enclosing the optical fibers on the heating board with an inorganic powder material.

6. The method for heating the fusion spliced portion of optical fibers according to claim 4, wherein the inorganic powder material is aluminum nitride powder.

7. The method for heating the fusion spliced portion of optical fibers according to claim 5, wherein the inorganic powder material is aluminum nitride powder.

8. The method for heating the fusion spliced portion of optical fibers according to claim 2, further comprising:

employing the heating board and the lid member as the members for an optical fiber array assembly.

9. An apparatus for heating a fusion spliced portion of a pair of optical fibers respectively having different mode field diameters, said apparatus comprising:

a heating board for mounting a vicinity of the fusion spliced portion of optical fibers thereon; and a heat source for heating said heating board so that the vicinity of the fusion spliced portion of optical fibers is heated via said heating board, wherein said heating board has a convex portion for mounting the vicinity of the fusion spliced portion of optical fibers thereon so that the vicinity of the fusion spliced portion of optical fibers is heated via the convex portion.

10. The apparatus for heating the fusion spliced portion of optical fibers according to claim 9, further comprising:

a lid member for pressing said optical fibers against said heating board.

11. The apparatus for heating the fusion spliced portion of optical fibers according to claim 9, further comprising:

a lid member having both side portions being in contact with said heating board for enclosing said optical fibers.

12. The apparatus for heating the fusion spliced portion of optical fibers according to claim 9, wherein a surface of said heating board on which said optical fibers are mounted has grooves for positioning and mounting said optical fibers on said heating board.

13. The apparatus for heating the fusion spliced portion of optical fibers according to claim 12, wherein each of said grooves is formed in a V-groove.

14. The apparatus for heating the fusion spliced portion of optical fibers according to claim 12, wherein each of said grooves is formed in a semi-spherical groove.

15. The apparatus for heating the fusion spliced portion of optical fibers according to claim 10, wherein said lid member is formed at least with a V-groove or semi-spherical groove for pressing said optical fibers.

16. The apparatus for heating the fusion spliced portion of optical fibers according to claim 9, wherein said heating board is made of ceramics.

17. The apparatus for heating the fusion spliced portion of optical fibers according to claim 10, wherein said lid member is made of ceramics.

18. The apparatus for heating the fusion spliced portion of optical fibers according to claim 16, wherein said ceramics is aluminum nitride.

19. The apparatus for heating the fusion spliced portion of optical fibers according to claim 17, wherein said ceramics is aluminum nitride.

20. The apparatus for heating the fusion spliced portion of optical fibers according to claim 9, wherein said heat source is a burner.

21. The apparatus for heating the fusion spliced portion of optical fibers according to claim 9, wherein said heat source is an exothermic resistive heater.

* * * * *